(12) United States Patent
Nakamura

(10) Patent No.: US 12,074,487 B2
(45) Date of Patent: Aug. 27, 2024

(54) ELECTRIC TOOL

(71) Applicant: Panasonic Intellectual Property Management Co., Ltd., Osaka (JP)

(72) Inventor: Akito Nakamura, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 283 days.

(21) Appl. No.: 17/629,214

(22) PCT Filed: Jul. 2, 2020

(86) PCT No.: PCT/JP2020/026078
§ 371 (c)(1),
(2) Date: Jan. 21, 2022

(87) PCT Pub. No.: WO2021/020021
PCT Pub. Date: Feb. 4, 2021

(65) Prior Publication Data
US 2022/0255410 A1    Aug. 11, 2022

(30) Foreign Application Priority Data
Jul. 29, 2019    (JP) ................. 2019-139204

(51) Int. Cl.
*H02K 16/02* (2006.01)
*B25F 5/00* (2006.01)
(Continued)

(52) U.S. Cl.
CPC ............ *H02K 16/02* (2013.01); *B25F 5/001* (2013.01); *H02K 7/1085* (2013.01); *H02K 11/215* (2016.01); *H02K 21/16* (2013.01)

(58) Field of Classification Search
CPC .... H02K 16/02; H02K 7/1085; H02K 11/215; H02K 21/16; B25F 5/001
See application file for complete search history.

(56) References Cited

U.S. PATENT DOCUMENTS

2010/0164422 A1\* 7/2010 Shu ................. H02K 21/029
                                                            318/540
2010/0283332 A1\* 11/2010 Takeda .............. H02K 11/33
                                                            310/50

FOREIGN PATENT DOCUMENTS

JP    07-107717 A    4/1995
JP    2006-271031 A    10/2006
(Continued)

OTHER PUBLICATIONS

Extended European Search Report dated Sep. 9, 2022 issued in the corresponding European Patent Application No. 20847767.9.
(Continued)

*Primary Examiner* — Tulsidas C Patel
*Assistant Examiner* — Mohammed Ahmed Qureshi
(74) *Attorney, Agent, or Firm* — Rimon P.C.

(57) ABSTRACT

A motor includes a stator and a rotor. The stator has a coil unit and an iron core. The coil unit includes a plurality of coils and an insulator. The iron core includes a plurality of teeth. The rotor has a permanent magnet. The rotor is provided on an inner side of the stator to be rotatable around a shaft as a center with a gap being provided between the stator and the rotor. The rotor includes a plurality of segments divided in a rotation axis direction, the plurality of segments being rotatable relatively to each other such that a magnetic flux output from the rotor changes.

20 Claims, 7 Drawing Sheets

(51) Int. Cl.
     *H02K 7/108*      (2006.01)
     *H02K 11/215*     (2016.01)
     *H02K 21/16*      (2006.01)

(56) References Cited

FOREIGN PATENT DOCUMENTS

| | | |
|---|---|---|
| JP | 2010-228041 A | 10/2010 |
| JP | 2017-121158 A | 7/2017 |
| JP | 2017-225231 A | 12/2017 |

OTHER PUBLICATIONS

Notice of Reasons for Refusal dated Jun. 6, 2023 issued in the corresponding Japanese Patent Application No. 2019-139204, with English translation.

International Search Report and Written Opinion issued in International Patent Application No. PCT/JP2020/026078, dated Sep. 29, 2020; with partial English translation.

\* cited by examiner

ELECTRIC TOOL

CROSS-REFERENCE OF RELATED APPLICATIONS

This application is the U.S. National Phase under 35 U.S.C. § 371 of International Patent Application No. PCT/JP2020/026078, filed on Jul. 2, 2020, which in turn claims the benefit of Japanese Application No. 2019-139204, filed on Jul. 29, 2019, the entire disclosures of which Applications are incorporated by reference herein.

TECHNICAL FIELD

The present disclosure generally relates to electric tools and more specifically relates to an electric tool including a motor.

BACKGROUND ART

Patent Literature 1 describes an electric tool including a motor and an output shaft driven by the motor. The motor described in Patent Literature 1 includes a stator and coils. The stator has: an annular part; and a plurality of teeth provided on an inner peripheral surface of the annular part and protruding in a radial direction of the annular part. The coils are wound around the respective teeth. Each coil include a first coil and a second coil. The first coil is wound around a radially outer part of one of the plurality of teeth. The second coil is wound around a radially inner part of the one of the plurality of teeth, the radially inner part being located on a radially inner side with respect to the first coil.

CITATION LIST

Patent Literature

Patent Literature 1: JP 2017-121158 A

SUMMARY OF INVENTION

In the motor described in Patent Literature 1, high speed rotation of the rotor in the case of a light load applied to the motor is desirable to improve work efficiency.

In view of the foregoing, it is an object of the present disclosure to provide an electric tool which enables work efficiency to be improved.

An electric tool according to one aspect of the present disclosure includes a motor, a trigger switch, a transmission mechanism, and a controller. The trigger switch is configured to be operated by a user. The transmission mechanism is disposed between the motor and an output shaft. The controller is configured to perform, based on an operation given to the trigger switch, drive control of the motor. The motor includes a stator and a rotor. The stator has a coil unit and an iron core. The coil unit includes a plurality of coils and an insulator. The iron core includes a plurality of teeth. The rotor has a permanent magnet. The rotor is provided on an inner side of the stator to be rotatable around a shaft as a center with a gap being provided between the stator and the rotor. The rotor includes a plurality of segments divided in a rotation axis direction, the plurality of segments being rotatable relatively to each other such that a magnetic flux output from the rotor changes.

DESCRIPTION OF EMBODIMENTS

Embodiment

Figure 1:
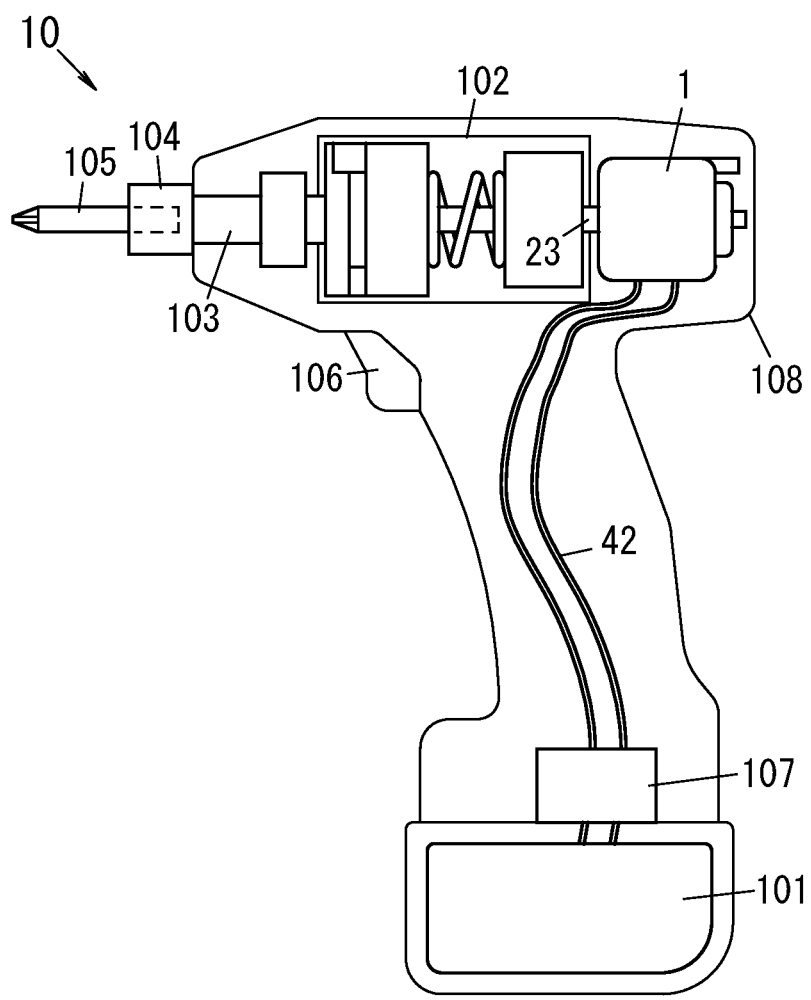
FIG. 1 is a schematic diagram of an electric tool according to the present embodiment.

An electric tool 10 according to an embodiment and a motor 1 according to the embodiment will be described below with reference to the drawings. The electric tool 10 is to be provided with the motor 1. Note that the embodiment described below is a mere example of various embodiments of the present disclosure. Various modifications may be made to the following embodiment depending on design and the like as long as the object of the present disclosure is achieved. Moreover, figures described in the following embodiment are schematic views, and therefore, the ratio of sizes and the ratio of thicknesses of components in the drawings do not necessarily reflect actual dimensional ratios.

(1) Overview

The electric tool 10 according to the present embodiment includes the motor 1, a trigger switch 106, a transmission mechanism 102, and a controller 107. The trigger switch 106 is configured to be operated by a user. The transmission mechanism 102 is disposed between the motor 1 and an output shaft 103. The controller 107 performs, based on an operation given to the trigger switch 106, drive control of the motor 1. The motor 1 includes a stator 3 and a rotor 2. The stator 3 has a coil unit 30 and an iron core 34. The coil unit 30 includes a plurality of coils 31 and an insulator 5. The iron core 34 includes a plurality of teeth 32. The rotor 2 has a permanent magnet 22. The rotor 2 is provided on an inner side of the stator 3 to be rotatable around a shaft 23 as a center with a gap 6 being provided between the stator 3 and the rotor 2. The rotor 2 includes a plurality of segments divided in a rotation axis direction X. The plurality of segments are rotatable relatively to each other such that a magnetic flux output from the rotor changes.

The electric tool 10 according to the present embodiment changes such that a magnet flux output from the rotor 2 decreases when a load applied to the rotor 2 is light. This enables, when the load applied to the rotor 2 is light, the rotor 2 to be rotated at an increased speed, thereby leading to high work efficiency.

In the electric tool 10 according to the present embodiment, the motor 1 has a mechanism (governor system) that autonomically changes the magnetic flux output from the rotor 2. Thus, the motor 1 achieves no loss of the magnetic flux and has better efficiency than a motor controlled by field weakening control. Moreover, when the magnetic flux output from the rotor 2 is small, the rotor 2 hardly adsorbs a magnetic substance such as iron powder, which reduces failures.

(2) Details (2.1) Electric Tool

As shown in FIG. 1, the electric tool 10 according to the present embodiment includes the motor 1, the trigger switch 106, the transmission mechanism 102, and the controller 107. That is, the motor 1, the trigger switch 106, the transmission mechanism 102, and the controller 107 are components of the electric tool 10. The electric tool 10 further includes a battery pack 101, the transmission mechanism 102, the output shaft 103, a chuck 104, a tip piece 105, the trigger switch 106, and the controller 107. The motor 1 according to the present embodiment is an electric tool motor that drives the tip piece 105. That is, the tip piece (also referred to as a bit) 105 is a member that is driven by driving force of the electric tool motor which is the motor 1. That is, the motor 1 is a drive source that drives the tip piece 105.

The electric tool 10 further includes the battery pack 101 that supplies electric power to the motor 1. That is, the battery pack 101 is a direct-current power supply that supplies a current for driving the motor 1. The battery pack 101 includes, for example, one or more secondary batteries.

The transmission mechanism 102 is disposed between the motor 1 and the output shaft 103. The transmission mechanism 102 adjusts an output (driving force) of the motor 1 and then outputs the driving force to the output shaft 103. The output shaft 103 is a member configured to be driven (e.g., rotated) by the driving force output from the transmission mechanism 102. The chuck 104 is a member which is fixed to the output shaft 103 and to which the tip piece 105 is to be detachably attached. The tip piece 105 is, for example, a screwdriver, a socket, or a drill. Of various types of tip pieces 105, a tip piece 105 according to an application is to be attached to the chuck 104.

The trigger switch 106 is configured to be operated by a user. That is, the trigger switch 106 is an operation unit configured to receive an operation for controlling the rotation of the motor 1. By an operation of pulling the trigger switch 106, the motor 1 is switchable between on and off states. In addition, the rotational velocity of the output shaft 103, that is, the rotational velocity of the motor 1, is adjustable by the manipulative variable indicating how deep the trigger switch 106 has been pulled.

The controller 107 performs, based on an operation given to the trigger switch 106, drive control of the motor 1. That is, the controller 107 rotates or stops the motor 1 in accordance with the operation given to the trigger switch 106 and also controls the rotational velocity of the motor 1. In the electric tool 10, the tip piece 105 is attached to the chuck 104. Then, an operation is given to the trigger switch 106 to control the rotational velocity of the motor 1, thereby controlling the rotational velocity of the tip piece 105. The controller 107 is electrically connected to the motor 1 and the battery pack 101 via a wire 42.

A housing 108 houses the transmission mechanism 102, the output shaft 103, the wire 42, and the controller 107 in addition to the motor 1. The chuck 104 and the trigger switch 106 are provided outside the housing 108.

The electric tool 10 according to the embodiment includes the chuck 104 to make the tip piece 105 replaceable depending on the intended use. However, the tip piece 105 does not have to be replaceable. Alternatively, the electric tool 10 may also be designed to allow the use of only a particular type of tip piece 105.

(2.2) Motor

The motor 1 according to the present embodiment is, for example, a brushless motor. The motor 1 includes the stator 3 and the rotor 2. That is, the stator 3 and the rotor 2 are components of the motor 1. The motor 1 further includes the insulator 5 and a sensor substrate 41 (see FIG. 3).

The motor 1 includes the rotor 2 and a plurality of (in the present embodiment, nine) coils 31. The rotor 2 is rotatable with respect to the stator 3. That is, a magnetic flux generated from the plurality of coils 31 wound around the iron core 34 generates electromagnetic force which rotates the rotor 2. The motor 1 transmits the rotational force (driving force) of the rotor 2 from the shaft 23 to the transmission mechanism 102.

(2.3) Rotor

The rotor 2 has the permanent magnet 22. That is, the rotor 2 includes a rotor core 21 which is cylindrical, a plurality of (in FIG. 5, six) permanent magnets 22, and the shaft 23. The shaft 23 is held on an inner side of the rotor core 21. The plurality of permanent magnets 22 are arranged in a polygonal shape (in FIG. 5, in a hexagonal shape) surrounding the center of the rotor core 21.

Here, the rotor core 21 is in the shape of a circle when viewed in the rotation axis direction X of the rotor core 21, and the center of the rotor core 21 corresponds to the center of the circle. Each permanent magnet 22 is in the shape of a rectangular parallelepiped. The shape of each permanent magnet 22 is rectangular as viewed in the rotation axis direction X of the rotor core 21.

The rotor core 21 includes a plurality of steel plates. The rotor core 21 includes the plurality of steel plates stacked in the thickness direction of the steel plates. Each steel plate is made of a magnetic material. Each steel plate is, for example, a silicon steel plate.

The rotor core 21 has a cylindrical shape concentric with a coupler 33 of the iron core 34. In the rotation axis direction X of the rotor core 21, locations of both ends of the rotor core 21 are substantially aligned with locations of both ends of the iron core 34. That is, the thickness (the dimension in the rotation axis direction X) of the rotor core 21 is substantially equal to the thickness (the dimension in the rotation axis direction X) of the iron core 34. Here, a first end (an end facing a first bearing 71) of the rotor core 21 and a first end of the iron core 34 does not have to exactly overlap each other but may be shifted from each other within an allowable error range. Moreover, a second end (an end facing a second bearing 72) of the rotor core 21 and a second end of the iron core 34 does not have to exactly overlap each other but may be shifted from each other within an allowable error range. For example, the shift may be within 3%, 5% or 10% of the thickness of the rotor core 21.

Figure 2:
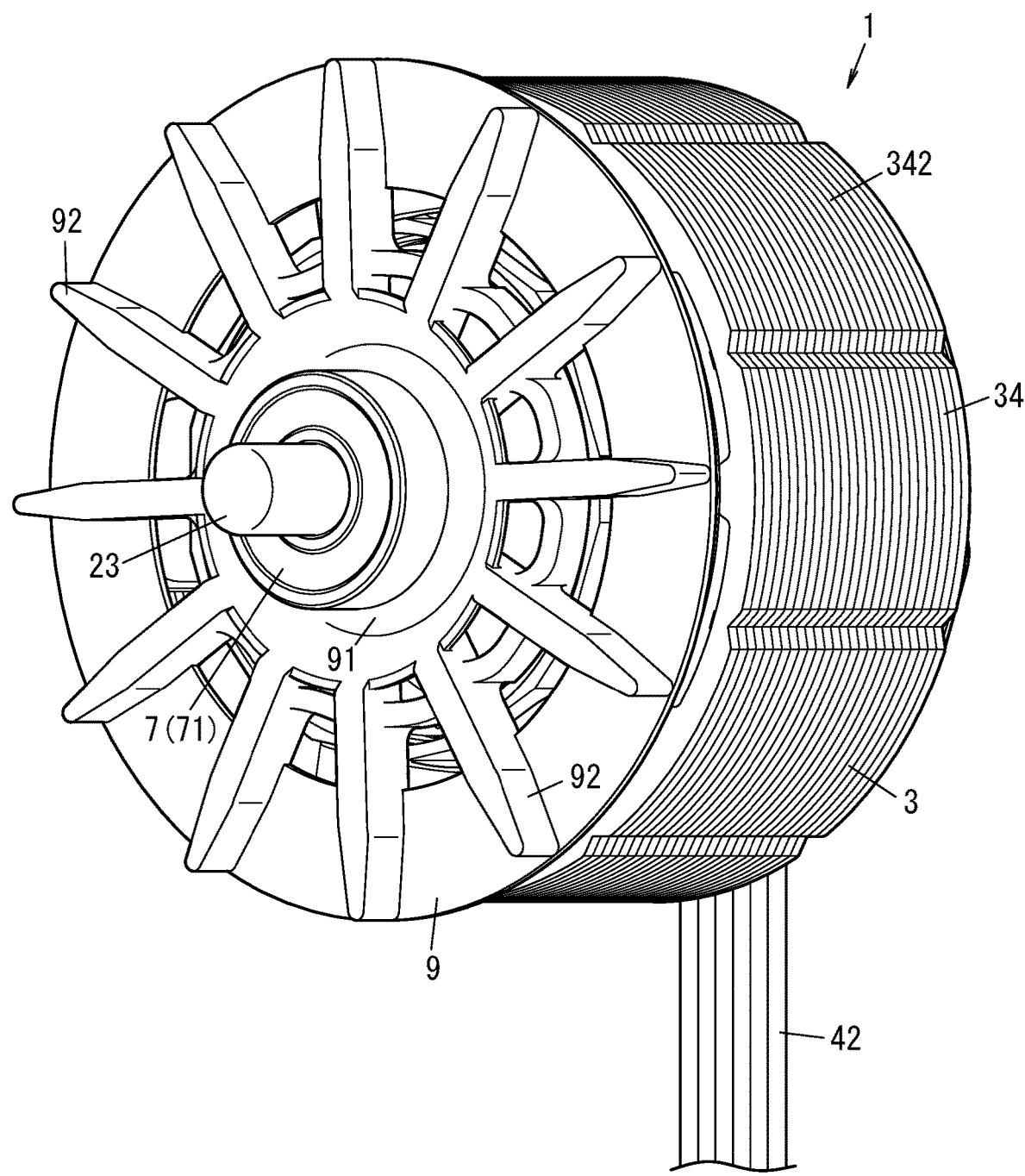
FIG. 2 is a perspective view of a motor to be used for the electric tool according to the present embodiment.

The shaft 23 is held on the inner side of the rotor core 21. As shown in FIG. 2, the rotor core 21 has a shaft hole 231 through which the shaft 23 extends.

Each permanent magnet 22 is, for example, a neodymium magnet. Each permanent magnet 22 has two magnetic poles aligned in the circumferential direction of the rotor core 21. Each two permanent magnets 22 adjacent to each other are arranged such that the same poles face each other in the circumferential direction of the rotor core 21.

The rotor 2 is disposed rotatably with respect to the stator 3. That is, the rotor 2 rotates with respect to the stator 3 with the rotation axis direction X as the center in a space 35 on the inner side of the stator 3, the rotation axis direction X being the same direction as a direction in which the shaft 23 extends. The space on the inner side of the stator 3 is a space surrounded by the cylindrical coupler 33. The space is open on both sides in the rotation axis direction X.

Figure 5:
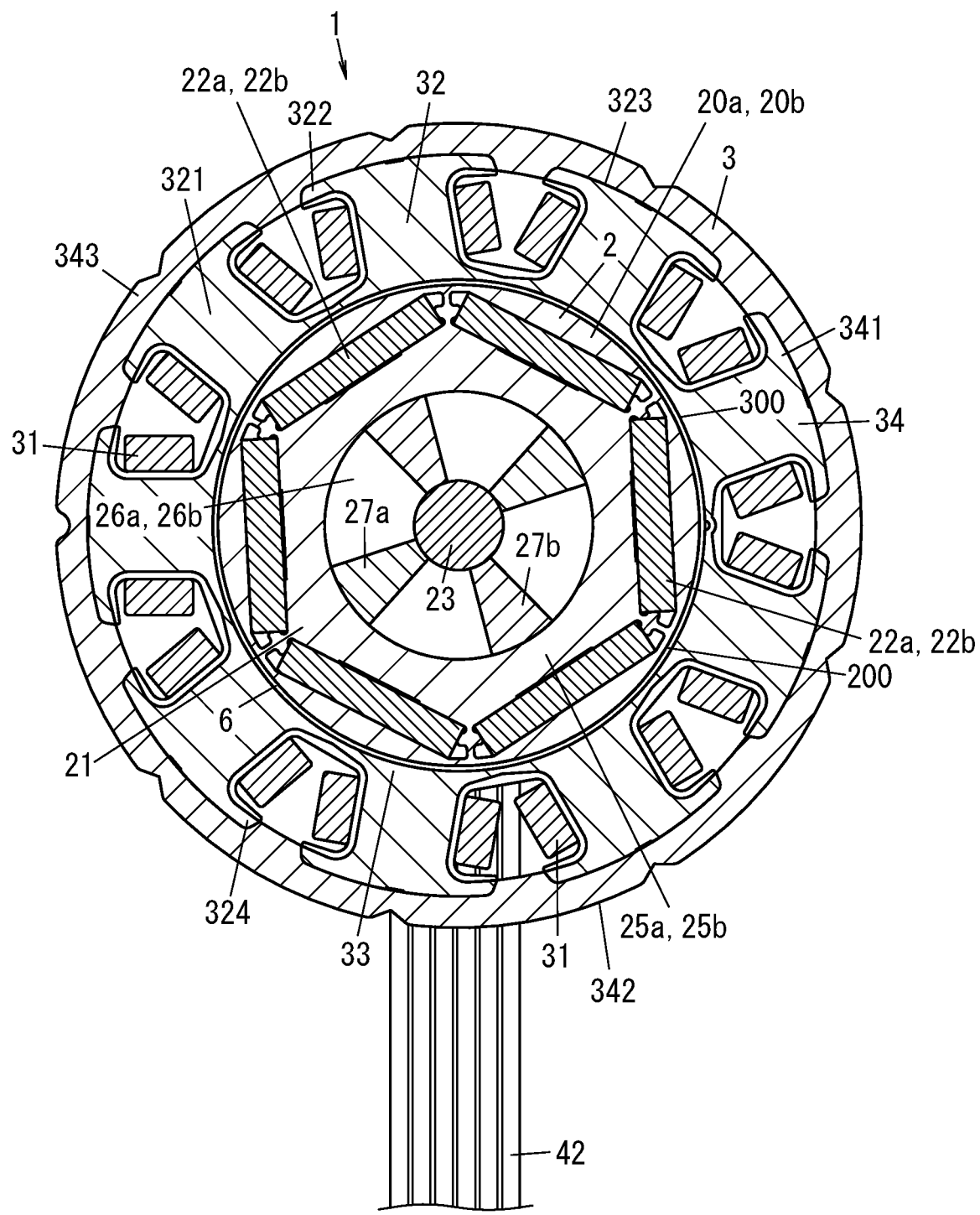
FIG. 5 is a sectional view of the motor.

The rotor 2 is provided on the inner side of the stator 3 to be rotatable around the shaft 23 as the center with the gap 6 being provided between the stator 3 and the rotor 2. That is, the rotor 2 is disposed on the inner side of the stator 3 via the stator 3 and the gap 6. That is, as shown in FIG. 5, the gap 6 is provided between an inner peripheral surface 300 of the coupler 33 of the stator 3 and an outer peripheral surface 200 of the rotor core 21 of the rotor 2. The dimension G of the gap 6 may be 0.3 mm to 0.5 mm but is not limited to this example.

Figure 6A:
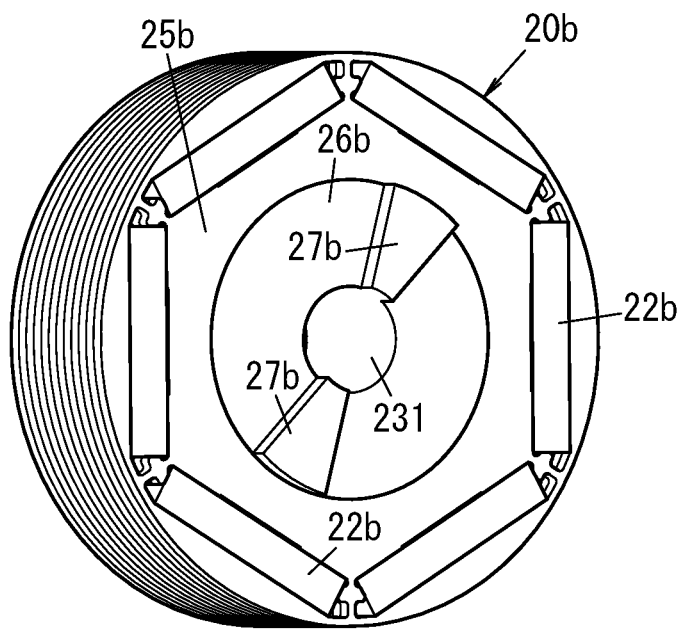
FIG. 6A is a perspective view of a second rotor part to be used for the motor.
Figure 6B:
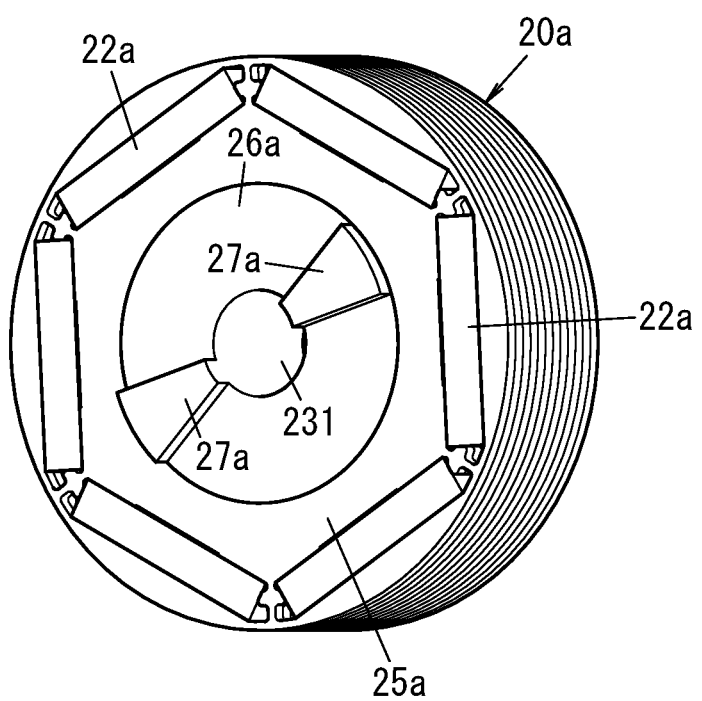
FIG. 6B is a perspective view of a first rotor part to be used for the motor.

The rotor 2 includes the plurality of segments divided in the rotation axis direction X, and the plurality of segments are rotatable relatively to each other such that the magnetic flux output from the rotor changes. That is, the rotor 2 is divided into a plurality of segments along the rotation axis direction X. In the present embodiment, the rotor 2 is divided into a first rotor part 20a and a second rotor part 20b as shown in FIGS. 6A and 6B. That is, at least one segment of the plurality of segments of the rotor 2 is formed as the second rotor part 20b.

The first rotor part 20a has a first rotor core 21a as the rotor core 21. The first rotor part 20a further has first permanent magnets 22a as the permanent magnets 22. The first rotor core 21a has a first core part 26a and a first outer peripheral part 25a. The first core part 26a has a cylindrical shape extending in the rotation axis direction X, and at the center of the first core part 26a, the shaft hole 231 penetrates in the rotation axis direction X. The first outer peripheral part 25a has a cylindrical shape extending in the rotation axis direction X and surrounds the entire circumference of the outer perimeter (around the rotation axis direction X) of the first core part 26a. The first permanent magnets 22a are provided to the first outer peripheral part 25a.

The second rotor part 20b has a second rotor core 21b as the rotor core 21. The second rotor part 20b further has second permanent magnets 22b as the permanent magnets 22. The second rotor core 21b has a second core part 26b and a second outer peripheral part 25b. The second core part 26b has a cylindrical shape extending in the rotation axis direction X, and at the center of the second core part 26b, the shaft hole 231 penetrates in the rotation axis direction X. The second outer peripheral part 25b has a cylindrical shape extending in the rotation axis direction X and surrounds the entire circumference of the outer perimeter (around the rotation axis direction X) of the second core part 26b. The second permanent magnets 22b are provided to the second outer peripheral part 25b.

The rotor 2 includes the plurality of segments divided in the rotation axis direction X, and the plurality of segments are rotatable relatively to each other such that the magnetic flux output from the rotor 2 changes in accordance with a torque applied to the shaft 23. That is, the first rotor part 20a and the second rotor part 20b are divided such that the magnetic flux output from the rotor 2 changes in accordance with the torque applied to the shaft 23.

The rotor 2 further includes a clutch connecting the plurality of segments of the rotor 2 to each other. That is, the first rotor part 20a and the second rotor part 20b are configured such that power is arbitrarily and intermittently transmitted from one of the first rotor part 20a and the second rotor part 20b to the other of the first rotor part 20a and the second rotor part 20b. The clutch is a magnetic clutch. That is, the clutch include the first permanent magnets 22a provided to the first rotor part 20a and the second permanent magnets 22b provided to the second rotor part 20b.

At least one segment of the plurality of segments of the rotor 2 is formed as the first rotor part 20a. The position of the rotor 2 is sensed by sensing the position of the first rotor part 20a by the sensor element 43. That is, rotation of the rotor 2 is performed by the first rotor part 20a which dominantly rotates. That is, the second rotor part 20b is subordinately rotated along with the rotation of the first rotor part 20a. The position of the rotor 2 refers to a rotational position of the rotor 2 which rotates around the shaft in the rotation axis direction X and is the position of the rotor 2 with respect to the stator 3. The sensor element 43 is fixed to the stator 3, and the sensor element 43 senses the position of the rotor 2.

The first rotor part 20a is not fixed to the shaft 23. That is, the first rotor part 20a freely rotates with respect to the shaft 23. In contrast, the second rotor part 20b is fixed to the shaft 23. That is, the second rotor part 20b rotates together with the shaft 23.

The first rotor part 20a has a pair of first projection sections 27a. The second rotor part 20b has a pair of second projection sections 27b. The pair of first projection sections 27a and the pair of second projection sections 27b are respectively provided on a surface of the first rotor part 20a and a surface of the second rotor part 20b, the surface of the first rotor part 20a and the surface of the second rotor part 20b facing each other. The pair of first projection sections 27a are provided at the first core part 26a. The pair of second projection sections 27b are provided at the second core part 26b.

The rotor 2 is configured to rotate forwardly and reversely. That is, the rotor 2 is configured to rotate clockwise and anticlockwise with respect to the stator 3.

(2.4) Stator

The stator 3 has the coil unit 30 and the iron core 34. That is, the plurality of coils 31 and the iron core 34 are components of the stator 3. The coil unit 30 includes the plurality of coils 31 and the insulator 5. That is, the plurality of coils 31 and the insulator 5 are components of the coil unit 30.

The iron core 34 includes a center core 341 and an external sleeve 342. The external sleeve 342 is attached to the center core 341. The iron core 34 includes the plurality of teeth 32. That is, the center core 341 includes the coupler 33 which is cylindrical and the plurality of (in FIG. 6, nine) teeth 32. The rotor 2 is disposed in the space 35 on an inner side of the coupler 33. Each tooth 32 includes a body 321 and two extremity parts 322. The body 321 protrudes, from the coupler 33, outward in the radial direction of the coupler 33. The two extremity parts 322 extend from a tip end portion of the body 321 in directions intersecting a direction in which the body 321 protrudes.

The stator 3 includes the coupler 33. That is, the coupler 33 provided to the iron core 34 is a component of the stator 3. The coupler 33 couples at least some adjacent teeth 32. That is, some or all of the adjacent teeth 32 are coupled by the coupler 33.

The coils 31 are disposed on the respective teeth 32 via the insulator 5. That is, each coil 31 is wound around the body 321 with the insulator 5 (see FIG. 3) being provided between each coil 31 and the body 321. The coupler 33 is located closer to the rotor 2 than the coil 31 is. That is, the coupler 33 is located between the coil 31 and the rotor 2.

The two extremity parts 322 are provided as a latch for suppressing the coil 31 from falling off the body 321. That is, when the coil 31 is about to move toward the tip end of the body 321, the coil 31 is caught by the two extremity parts 322, and thereby, the coil 31 is suppressed from falling off.

The center core 341 of the iron core 34 of the stator 3 includes a plurality of steel plates. The center core 341 includes the plurality of steel plates stacked in the thickness direction of the steel plates. Each steel plate is made of a magnetic material. Each steel plate is, for example, a silicon steel plate.

Figure 4:
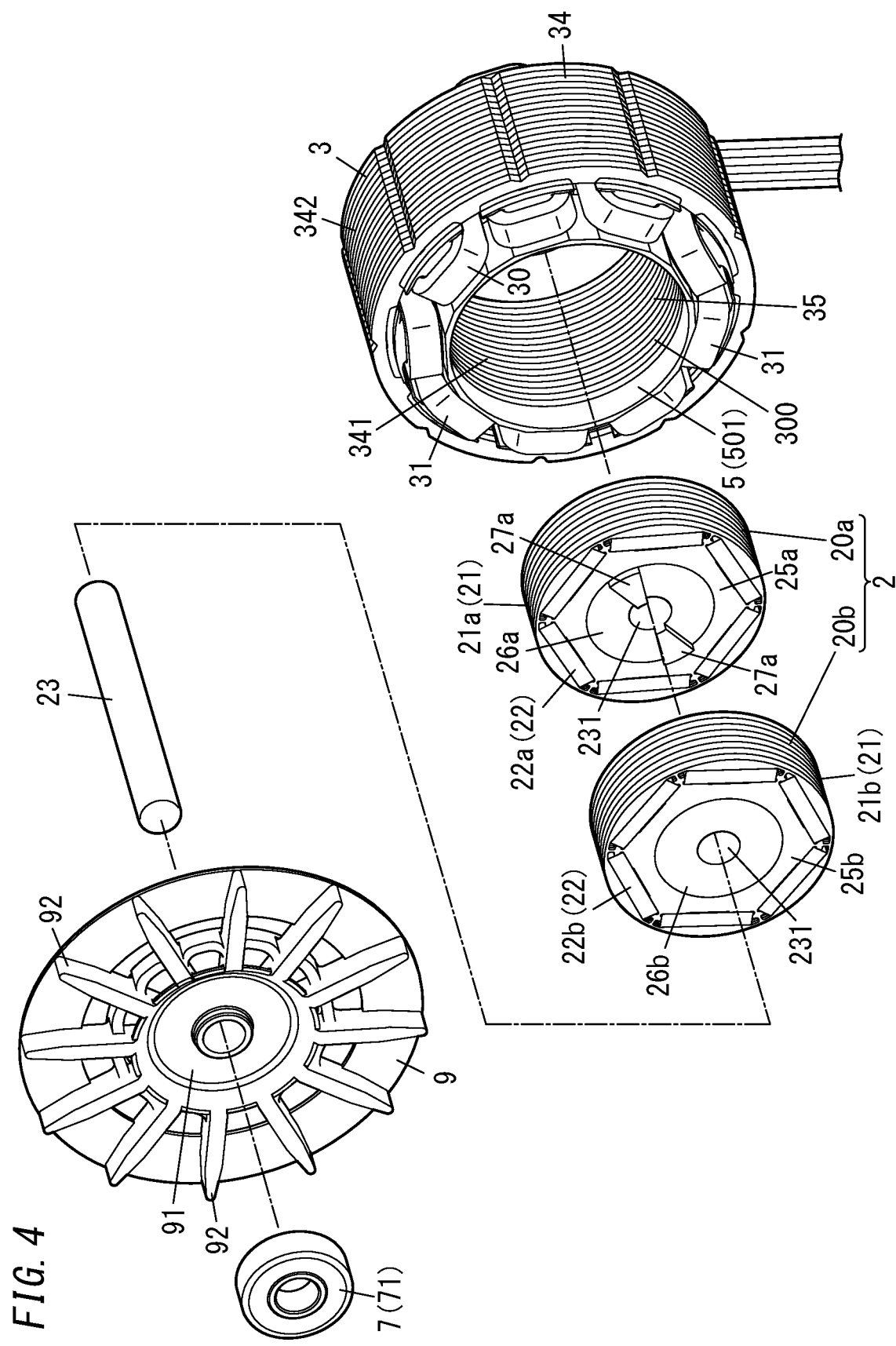
FIG. 4 is an exploded perspective view of the motor.

As shown in FIG. 4, the coupler 33 has a cylindrical shape. The axial direction of the coupler 33 coincides with the thickness direction of the plurality of steel plates. The coupler 33 is continuous in the circumferential direction. In other words, the coupler 33 is uninterrupted and is continuous in the circumferential direction.

The shape of the body 321 of each tooth 32 is in the shape of a rectangular parallelepiped. The coupler 33 is integrated with the teeth 32. That is, the coupler 33 and the teeth 32 are not separate members but are continuously made of the same member. The body 321 protrudes, from the coupler 33, outward in the radial direction of the coupler 33. The bodies 321 of the plurality of teeth 32 are provided at equal intervals in the circumferential direction of the coupler 33.

The two extremity parts 322 extend from the tip end portion of the body 321 in directions intersecting a direction in which the body 321 protrudes. More specifically, the two extremity parts 322 are provided, the tip end portion of each body 321, on respective two sides in the circumferential direction of the coupler 33. The two extremity parts 322 extend in the circumferential direction of the coupler 33.

Each extremity parts 322 has an outer surface in the radial direction of the coupler 33, and the outer surface includes a curved surface 323. As viewed in the axial direction of the coupler 33 (the same direction as the rotation axis direction X of the rotor 2), the curved surface 323 has an arc-like shape along a concentric circle with the coupler 33.

Each extremity parts 322 has a portion continuous with the body 321, and the portion has a curved part 324. The curved part 324 curves outward in the radial direction of the coupler 33 to be away from the body 321 in the circumferential direction of the coupler 33. That is, of each extremity part 322, the curved part 324, which is a part facing the base end, is beveled and is curved.

(2.5) External Sleeve

As shown in FIG. 5, the external sleeve 342 includes a plurality of steel plates. The external sleeve 342 includes the plurality of steel plates stacked in the thickness direction of the steel plates. Each steel plate is made of a magnetic material. Each steel plate is, for example, a silicon steel plate. The external sleeve 342 has a cylindrical shape. The external sleeve 342 is attached to the plurality of teeth 32 to surround the plurality of teeth 32.

The external sleeve 342 has a plurality of (nine) fitting parts 343. That is, the external sleeve 342 has the same number of fitting parts 343 as the teeth 32. Each of the plurality of fitting parts 343 is a recess provided in the inner peripheral surface of the external sleeve 342. The plurality of fitting parts 343 correspond to the plurality of teeth 32 on a one-to-one basis. At least either the fitting parts 343 or the teeth 32 moves in the radial direction of the coupler 33, thereby fitting each of the teeth 32 into a corresponding one of the fitting parts 343. The external sleeve 342 is in this way attached to the plurality of teeth 32.

In each fitting part 343, a portion, including the two extremity parts 322, of the tooth 32 is fitted. Thus, the length of each fitting part 343 in the circumferential direction of the external sleeve 342 is equal to the length between a projection tip of one extremity part 322 of the two extremity parts 322 protruding from the body 321 and a projection tip of the other extremity part 322 of the two extremity parts 322. Note that in the present specification, "equal" is not limited to refer to the case where a plurality of values exactly match each other, but "equal" also refers to the case where the plurality of values are different from each other within an allowable error range. For example, "equal" may be used to refer to a case including an error within 3%, within 5%, or within 10%.

In a state where the insulator 5 is attached to the center core 341 and the coil 31 is wound around the center core 341, the external sleeve 342 is attached the plurality of teeth 32 by, for example, shrink-fitting. That is, the external sleeve 342 is heated to expand in the radial direction, and in this state, the center core 341 is disposed on an inner side of the external sleeve 342. Thus, the inner surface of the external sleeve 342 faces the tip ends of the plurality of teeth 32 in the radial direction of the coupler 33 with a small gap between the inner surface and each of the teeth 32. The temperature of the external sleeve 342 then lowers, and the external sleeve 342 shrinks, and thereby, the inner surface of the external sleeve 342 comes into contact with the tip ends of the plurality of teeth 32. That is, along with the shrinkage of the external sleeve 342, the plurality of fitting parts 343 move in a radially inward direction of the external sleeve 342, and thereby, the plurality of teeth 32 are fit into the plurality of fitting parts 343. The external sleeve 342 applies contact pressure to the plurality of teeth 32 in the radially inward direction of the external sleeve 342.

(2.6) Coil

Nine coils 31 are provided to correspond to the nine teeth 32. The nine coils 31 are electrically connected to one another. Each coil 31 includes a winding wire 311 which is, for example, an enamel wire. The winding wire includes a linear conductor and an insulating cover covering the conductor.

Each coil 31 is located on an outer side of the coupler 33. That is, the coupler 33 is located on an inner side (a side facing the rotor 2) of the coil 31. Each coil 31 has at least a part which is not covered with a cover 51. That is, one end (an end facing a second insulator 502) of each coil 31 in the rotation axis direction X is not covered with the cover 51, and the plurality of coils 31 are aligned such that their respective one ends surround the cover 51.

(2.7) Insulator

The insulator 5 is a member having electrical insulation properties. The insulator 5 is made of, for example, a resin such as Nylon 66 containing about 30 weight % of a filler such as glass fibers.

The insulator 5 fixes the sensor substrate 41 to the stator 3. This enables the stator 3 and the sensor substrate 41 to be electrically insulated from each other.

Figure 3:
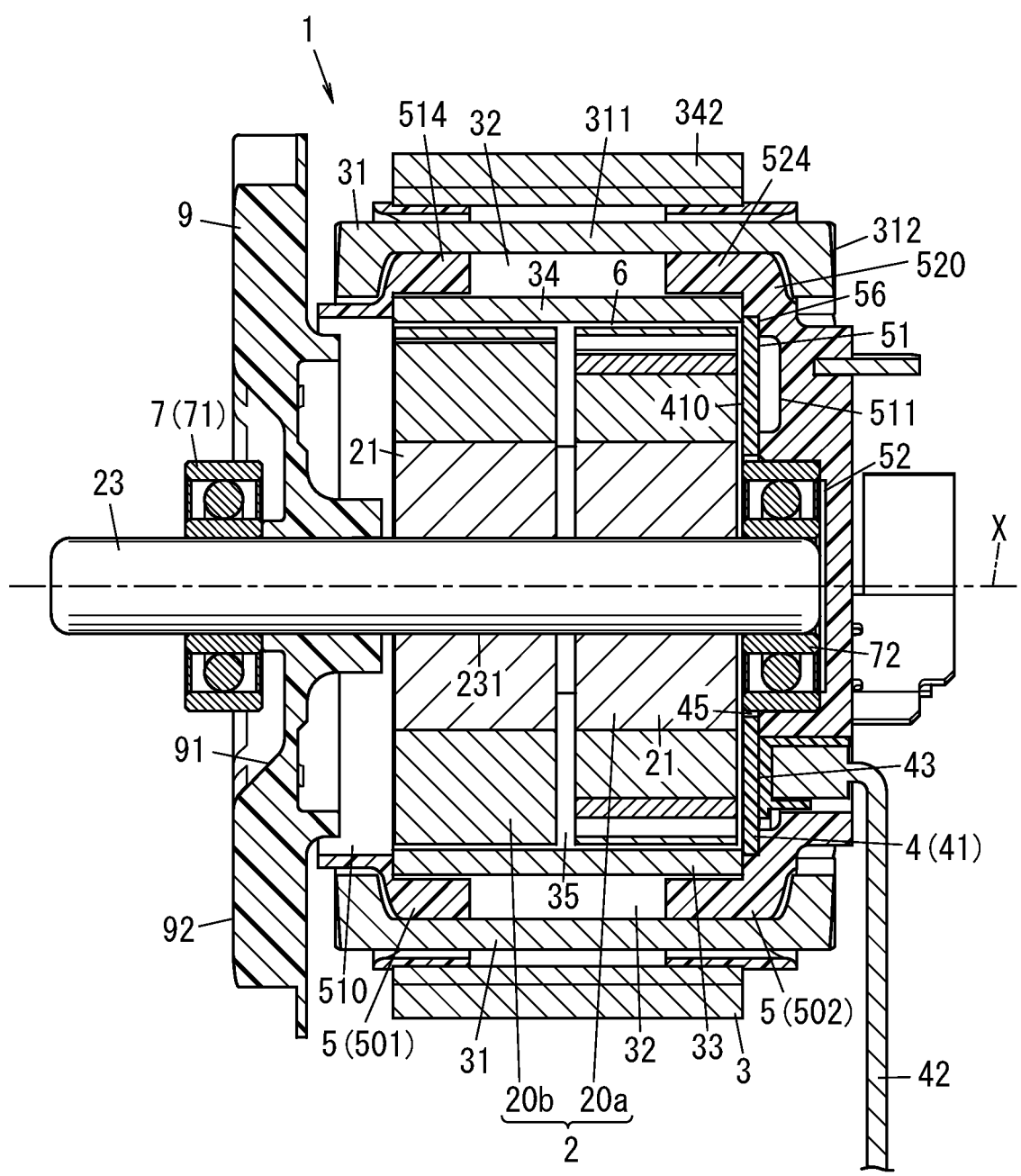
FIG. 3 is a sectional view of the motor.

As shown in FIG. 3, the insulator 5 includes a first insulator 501 and the second insulator 502. The first insulator 501 and the second insulator 502 are integrated with the iron core 34 of the stator 3, for example, by insert molding. The first insulator 501 and the second insulator 502 are disposed to be aligned in the rotation axis direction X.

The first insulator 501 covers one end of the iron core 34 in the rotation axis direction X. Specifically, the first insulator 501 has an annular part 510 and a plurality of (in the present embodiment, nine, i.e., the same number of) cover parts 514 (as the teeth 32). The annular part 510 has an outer diameter which is substantially the same as the outer diameter of the cylindrical coupler 33 of the iron core 34. The annular part 510 covers, on one side, the coupler 33 and the teeth 32 in the rotation axis direction X. The cover parts 514 are provided at equal intervals on an inner peripheral surface in a circumferential direction of the annular part 510.

The second insulator 502 covers the other end of the iron core 34 in the rotation axis direction X. Specifically, the second insulator 502 has an annular part 520 and a plurality of (in the present embodiment, nine, i.e., the same number of) cover parts 524 (as the teeth 32). The annular part 520 has an outer diameter which is substantially the same as the outer diameter of the cylindrical coupler 33 of the iron core 34. The annular part 520 covers, on the other side, the coupler 33 and the teeth 32 in the rotation axis direction X. The cover parts 524 are provided at equal intervals on an inner peripheral surface in a circumferential direction of the annular part 520.

The coil 31 is formed by winding the winding wire 311 around the tooth 32 covered with the cover parts 514 and 524.

The insulator 5 is provided with the cover 51. The cover 51 is provided on the second insulator 502. The cover 51 is mechanically integrated with the insulator 5. That is, the cover 51 is mechanically integrated with the second insulator 502. Since the insulator 5 is fixed to the stator 3 by the winding wire 311 of the coil 31, the cover 51 is fixed to the stator 3 by the winding wire 311 of the coil 31. That is, the second insulator 502 is fixed to the stator 3 by the winding wire 311 of the coil 31, and thereby, the cover 51 mechanically integrated with the second insulator 502 is also fixed to the stator 3.

The cover 51 is disposed to face at least the space 35 on the inner side of the coupler 33 in the rotation axis direction X of the rotor 2. That is, in the rotation axis direction X of the rotor 2, the cover 51 faces a part of the space 35 on the inner side of the coupler 33, the part facing the second insulator 502. The cover 51 covers the gap 6. That is, the gap 6 between the outer peripheral surface of the rotor 2 and the inner peripheral surface of the stator 3 is covered with the cover 51 in the rotation axis direction X. The cover 51 covers the gap 6 over the entire length in the rotation direction of the rotor 2. That is, the cover 51 faces the gap 6 over the entire length in the rotation direction of the rotor 2 in the rotation axis direction X.

Of the cover 51, the counter surface 511 facing the stator 3 or the rotor 2 in the rotation axis direction X of the rotor 2 is located on an inner side of an outermost surface 312 in the rotation axis direction X of the coil 31.

The insulator 5 has a bearing holder 52. The bearing holder 52 is provided to the second insulator 502. The bearing holder 52 holds bearings 7 of the rotor 2. That is, of the two bearings 7 of the rotor 2, the second bearing 72 facing the second insulator 502 is held by the bearing holder 52. The bearing holder 52 is in contact with either an inner perimeter tip end of the tooth 32 or the coupler 33 and is positioned on a flat surface orthogonal to the rotation axis direction X of the rotor 2. That is, when the second insulator 502 is fixed to the stator 3, the second insulator 502 comes into contact with either the inner perimeter tip end of the tooth 32 or the coupler 33, thereby, positioning the second insulator 502 is. Thus, the bearing holder 52 provided to the second insulator 502 is positioned, on the flat surface orthogonal to the rotation axis direction X, with respect to the inner perimeter tip end of the tooth 32 or the coupler 33.

The bearing holder 52 comes into contact with the coupler 33, and thereby, the bearing holder 52 is positioned. That is, when the second insulator 502 is fixed to the stator 3, the second insulator 502 comes into contact with the coupler 33, and thereby, the second insulator 502 is positioned. Thus, the bearing holder 52 provided to the second insulator 502 is positioned, on the flat surface orthogonal to the rotation axis direction X, with respect to the coupler 33. The bearing holder 52 is positioned by being brought into contact with at least the outer peripheral surface of the coupler 33. That is, when the second insulator 502 is fixed to the stator 3, the second insulator 502 comes into contact with at least the outer peripheral surface of the coupler 33, thereby being positioned. Thus, the bearing holder 52 provided to the second insulator 502 is positioned, on the flat surface orthogonal to the rotation axis direction X, with respect to the coupler 33.

The bearing holder 52 comes into contact with three or more locations of inner perimeter tip ends of the teeth 32 or the coupler 33, and thereby, the bearing holder 52 is positioned. That is, when the second insulator 502 is fixed to the stator 3, the second insulator 502 comes into contact with three or more locations of the inner perimeter tip ends of the teeth 32 or the coupler 33, and thereby, the second insulator 502 is positioned. For example, the annular part 520 and the plurality of cover parts 524 come into contact with three or more locations of the coupler 33. Thus, the bearing holder 52 provided to the second insulator 502 is positioned, on the flat surface orthogonal to the rotation axis direction X, with respect to the coupler 33.

Between the bearing holder 52 and the rotor 2, the substrate 4 is disposed. That is, in the rotation axis direction X, the bearing holder 52, the rotor 2, and the substrate 4 are aligned, and the substrate 4 is between the bearing holder 52 and the rotor 2.

The inner side surface of the bearing 7 held by the bearing holder 52 is disposed closer to the rotor 2 than the inner side surface of the substrate 4 is in the rotation axis direction X. That is, as shown in FIG. 3, the bearing 7 is disposed by being held by the bearing holder 52, and in this case, an end surface (an inner side surface) of the bearing 7 facing the rotor 2 is disposed closer to the rotor 2 than a surface (an inner side surface) 410 of the substrate 4 facing the rotor 2 is.

Note that the cover 51 may include the bearing 7 holding the shaft 23. That is in a state where the bearing 7 is held by the bearing holder 52 of the cover 51, the bearing 7 may be provided to the cover 51. In this case, the bearing 7 receiving the shaft 23 is a component of the cover 51.

(2.8) Substrate

The substrate 4 is a so-called sensor substrate 41. That is, the sensor substrate 41 detects the angle of rotation of the rotor 2. That is, the sensor substrate 41 is a circuit board for detecting the rotational position of the rotor 2. The sensor substrate 41 is disposed on a side of the rotor 2 facing the second insulator 502 in the rotation axis direction X such that the sensor substrate 41 is parallel to an end surface of the rotation 2. The sensor element 43 is mounted on the sensor substrate 41. The sensor element 43 is, for example, a Hall element or an angle sensor (GMR). The sensor element 43 is an element for detecting the rotational position of the rotor 2.

The sensor substrate 41 has a substantially hexagonal shape when viewed in the rotation axis direction X. The sensor substrate 41 surrounds the entire circumference of the outer perimeter of the shaft 23. That is, the sensor substrate 41 is disposed on the entire circumference in the circumferential direction of the shaft 23.

As shown in FIG. 3, the sensor substrate 41 is disposed at a location between the insulator 5 and the iron core 34. That is, in the rotation axis direction X, the sensor substrate 41 is disposed at a location between the second insulator 502 of the insulator 5 and an end surface of the iron core 34. Moreover, the sensor substrate 41 is fixed by being pinched between the insulator 5 and the iron core 34. That is, the sensor substrate 41 is held between the second insulator 502 of the insulator 5 and the end surface of the iron core 34. The insulator 5 has a counter surface which faces the sensor substrate 41 and which has a depression 56 in which the sensor substrate 41 is to be fit. That is, the second insulator 502 of the insulator 5 has a surface which faces the rotor 2 and which has the depression 56, and the sensor substrate 41 is fit and housed in the depression 56. Moreover, the outer perimeter of the sensor substrate 41 and the inner perimeter of the depression 56 each have a polygonal shape. That is, the outer perimeter of the sensor substrate 41 has a polygonal shape such as a hexagonal shape when viewed in the rotation axis direction X so that the sensor substrate 41 hardly rotates with respect to the insulator 5. Moreover, the inner perimeter of the depression 56 has a polygonal shape such as a hexagonal shape when viewed in the rotation axis direction X so that the inner perimeter of the depression 56 corresponds to the outer perimeter of the sensor substrate 41. The outer perimeter of the sensor substrate 41 and the inner perimeter of the depression 56 may have different polygonal shapes.

The insulator 5 has a hole 57 through which the wire 42 connected to the sensor substrate 41 extends. That is, the wire 42 electrically connected to the battery pack 101 or the like is introduced through the hole 57 into the insulator 5 and is electrically connected to the sensor substrate 41. The hole 57 penetrates through the second insulator 502 in the thickness direction of the second insulator 502. The sensor element 43 mounted on the sensor substrate 41 is disposed to face away from the rotor 2. That is, the sensor substrate 41 is disposed such that the sensor element 43 faces away from the space 35. Thus, the sensor element 43 faces the second insulator 502.

On only one surface of the sensor substrate 41, a component 44 is mounted. That is, the component 44, such as a connector, to which the sensor element 43 and the wire 42 are connected is mounted on only a surface of the sensor substrate 41 facing the second insulator 502, and the sensor element 43 and the component 44 are not mounted on the surface 410 facing the stator 3. This enables the sensor substrate 41 to be disposed near the rotor 2. The sensor substrate 41 has a hole 45 penetrating the center part thereof in the thickness direction. In the hole 45, the second bearing 72 of the bearings 7 is disposed.

The sensor substrate 41 faces the gap 6 in the rotation axis direction X, and therefore, the sensor substrate 41 can also reduce dust entering the gap 6.

(2.9) Bearing

The motor 1 supports the shaft 23 rotatably by the two bearings 7. The first bearing 71 is disposed in a recess 91 provided in a fan 9. The second bearing 72 is disposed in the bearing holder 52 of the second insulator 502 of the insulator 5. The first bearing 71 is located frontward (on an opposite side) of the fan 9 (from the rotor 2) in the rotation axis direction X of the shaft 23. The thickness (dimension in the rotation axis direction X) of the first bearing 71 is shorter than the depth (dimension in the rotation axis direction X) of the recess 91.

(2.10) Fan

The fan 9 is fixed to the shaft 23 on an outer side of the stator 3 in the rotation axis direction X of the rotor 2. The fan 9 has a circular shape when viewed in the rotation axis direction X and has a hat shape in whole. The fan 9 has a recess 91 on an opposite side of the rotor 2 in the rotation axis direction X. The recess 91 is a space in which the first bearing 71 is to be housed. The recess 91 is a recessed portion of a center part of the fan 9. The fan 9 is rotatable in the circumferential direction of the shaft 23. The fan 9 has a plurality of blades 92 extending from the recess 91 in and along the radial direction.

The motor 1 further includes a fan 9 disposed on an opposite side of the stator 3 from the cover 51 in the rotation axis direction X. That is, the fan 9 is disposed on an opposite side from the cover 51 in the rotation axis direction X. The fan 9 causes an airflow which flows from the cover 51 toward the stator 3. That is, the airflow caused by the rotation of the fan 9 flows from the side at which the second insulator 502 is provided toward the first insulator 501.

(3) Operation

Figure 7A:
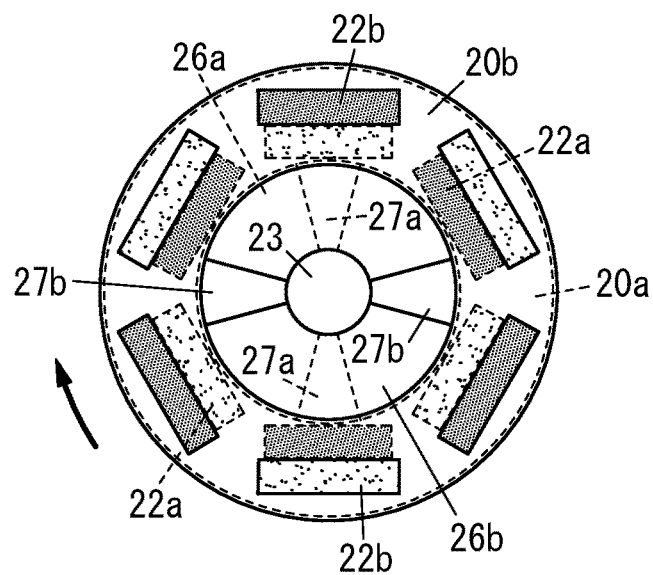
FIGS. 7A to 7C are schematic diagrams each illustrating operation of the motor.
Figure 7B:
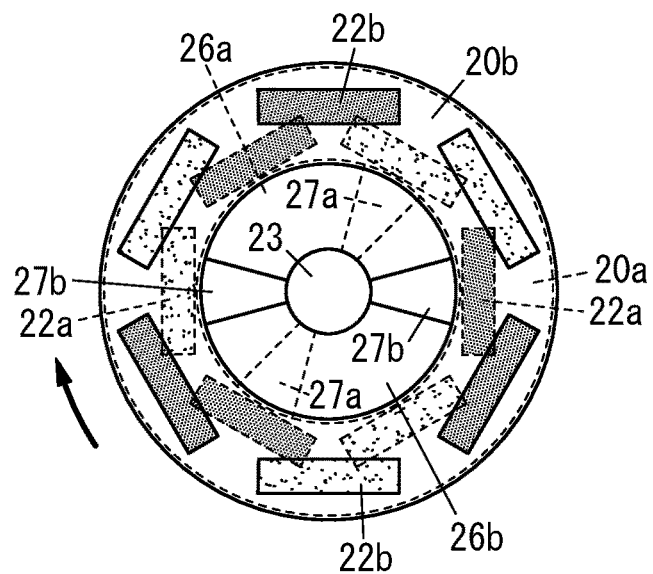
Figure 7C:
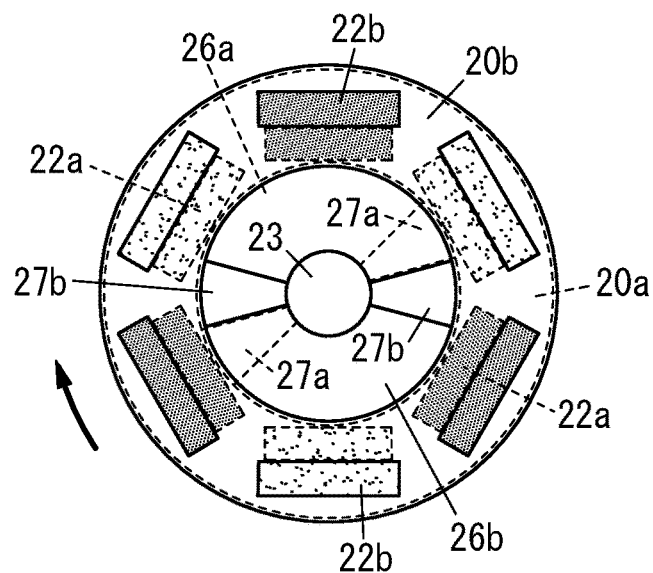

With reference to FIGS. 7A to 7C, operation of the electric tool 10 will be described. In FIGS. 7A to 7C, for the sake of understanding, locations of the first permanent magnet 22a and the second permanent magnet 22b are shifted from each other in a radial direction of the shaft 23 and the rotor 2. In practice, the first permanent magnet 22a and the second permanent magnet 22b are disposed to face each other in the rotation axis direction X. Moreover, the first permanent magnet 22a and the second permanent magnet 22b are distinguished from each other based on a sparse dot pattern and a dense dot pattern in terms of polarity. For example, when the first permanent magnet 22a and the second permanent magnet 22b represented by the sparse dot pattern are S poles, the first permanent magnet 22a and the second permanent magnet 22b represented by the dense dot pattern are N poles.

As shown in FIG. 7A, before the motor 1 is energized, the first rotor part 20a and the second rotor part 20b are disposed such that different poles of the first permanent magnet 22a and the second permanent magnet 22b face each other. In this state, the first permanent magnet 22a and the second permanent magnet 22b cancel their magnetic flux each other, and therefore, the magnetic flux generated by the rotor 2 is small.

Starting from the state shown in FIG. 7A, the motor 1 is energized, and in this case, if no torque is applied to the shaft 23, the rotor 2 rotates while the state shown in FIG. 7A is maintained by a magnetic clutch. Thus, when the torque applied to the shaft 23 is small, the magnetic flux generated by the rotor 2 is small, and an inductive voltage from the rotor 2 can be reduced.

Starting from the state shown in FIG. 7A, the torque is applied to the shaft 23, and in this case, as shown in FIG. 7B, each of the first rotor part 20a and the second rotor part 20b rotates to be positionally displaced around the rotation axis direction X. That is, when the torque is applied to the shaft 23, the rotation of the second rotor part 20b fixed to the shaft 23 becomes difficult. In contrast, the first rotor part 20a which is not fixed to the shaft 23 rotates in the state shown in FIG. 7A. Thus, the first permanent magnet 22a is slightly positionally displaced with respect to the second permanent magnet 22b in the rotation axis direction X. Thus, the first permanent magnet 22a and the second permanent magnet 22b cancel the magnetic flux each other, and the magnetic flux is smaller in FIG. 7B than in FIG. 7A, and thus, the magnetic flux generated from the rotor 2 increases.

Starting from the state shown in FIG. 7B, a further increased torque is applied to the shaft 23, and in this case, as shown in FIG. 7C, each of the first rotor part 20a and the second rotor part 20b rotates to be further positionally displaced around the rotation axis direction X. That is, when a still further increased torque is applied to the shaft 23, the rotation of the second rotor part 20b fixed to the shaft 23 becomes difficult. In contrast, the first rotor part 20a which is not fixed to the shaft 23 rotates in the state shown in FIG. 7A. Thus, the first permanent magnet 22a is slightly positionally displaced with respect to the second permanent magnet 22b in the rotation axis direction X. Moreover, the first projection sections 27a and the second projection sections 27b are caught on each other, and the first rotor part 20a and the second rotor part 20b rotate at the same speed.

The first rotor part 20*a* and the second rotor part 20*b* are disposed such that the same poles of the first permanent magnet 22*a* and the second permanent magnet 22*b* face each other. In this state, the rotor 2 is configured to increase the magnetic flux output from the rotor 2 as the torque applied to the shaft 23 increases. Thus, the first permanent magnet 22*a* and the second permanent magnet 22*b* cancel the magnetic flux each other, and the magnetic flux is smaller in FIG. 7C than in FIG. 7B, and thus, the magnetic flux generated from the rotor 2 increases.

As described above, the electric tool 10 according to the present embodiment is configured such that the magnet flux changes in accordance with the torque applied to the shaft 23. Thus, in the case of a low torque, the inductive voltage from the rotor 2 can be reduced, and the rotor 2 can be rotated at an increased speed, thereby improving work efficiency.

The rotor 2 includes the plurality of segments divided in the rotation axis direction X, and the plurality of segments are rotatable relatively to each other such that the magnetic flux output from the rotor 2 changes in accordance with the rotation speed of the shaft 23. That is, when a torque is applied to the shaft 23, the rotation speed of the shaft 23 changes, and therefore, the magnetic flux output form the rotor 2 changes. In this case, the rotor 2 is configured such that as the rotation speed of the shaft 23 increases, the magnetic flux output from the rotor 2 decreases. That is, as shown in FIG. 7A, when the shaft 23 rotates at high speed, the magnetic flux output from the rotor 2 is small.

The rotor 2 is configured such that a magnetic flux output from the rotor 2 changes in both the forward rotation and the reverse rotation. That is, in either case of the forward rotation or the reverse rotation, the magnetic flux changes as shown in FIGS. 7A to 7C.

(4) Variations

The first embodiment is one of the various embodiments of the present disclosure. Various modifications may be made to the first embodiment depending on design and the like as long as the object of the present disclosure is achieved.

In the above description, the motor 1 having six poles has been described, but this should not be construed as limiting. The motor 1 may be a 4-pole motor or an 8-pole motor.

In the above description, the rotor 2 is divided into two segments but may be divided into three or more pieces. In this case, at least one segment constitutes the first rotor part 20*a*. Moreover, at least another one segment different from the first rotor part 20*a* constitutes the second rotor part 20*b*. Furthermore, the remaining one segment may be either the first rotor part 20*a* or the second rotor part 20*b*.

In the above description, the position of the rotor 2 is detected by detecting the position of the first rotor part 20*a*, but this should not be construed as limiting. The position of the rotor 2 may be detected by detecting the position of the second rotor part 20*b*. In this case, the sensor element 43 may be configured to detect the position of the second rotor part 20*b*.

In the above description, the first rotor part 20*a* which dominantly rotates is not fixed to the shaft 23, and the second rotor part 20*b* which subordinately rotates is fixed to the shaft 23. However, this should not be construed as limiting. For example, the first rotor part 20*a*, which dominantly rotates, may be fixed to the shaft 23, but the second rotor part 20*b*, which subordinately rotates, does not have to be fixed to the shaft 23.

The operation of the motor 1 may be controlled in combination with the field weakening control.

The rotor 2 may be configured such that the change in the magnetic flux in the forward rotation is different from the change in the magnetic flux in the reverse rotation. That is, the motor 1 may be configured such that when the motor 1 is in the forward rotation, the magnetic flux output from the rotor 2 may be increased or, conversely, may be reduced as compared to the case where the motor 1 is in the reverse rotation. For example, a difference may be made between the forward rotation and the reverse rotation such that the torque of the motor 1 is greater in the reverse rotation than in the forward rotation. The difference between the change in the magnetic flux in the forward rotation and the change in the magnetic flux in the reverse rotation is made by making angles formed between the first rotor part 20*a* and the second rotor part 20*b* unequal to each other. That is, of four angles between the first rotor part 20*a* and the second rotor part 20*b*, two angles may be made large, and two angles may be made small.

(Summary)

As described above, an electric tool (10) according to a first aspect includes a motor (1), a trigger switch (106), a transmission mechanism (102), and a controller (107). The trigger switch (106) is configured to be operated by a user. The transmission mechanism (102) is disposed between the motor (1) and an output shaft (103). The controller (107) is configured to perform, based on an operation given to the trigger switch (106), drive control of the motor (1). The motor (1) includes a stator (3) and a rotor (2). The stator (3) has a coil unit (30) and an iron core (34). The coil unit (30) includes a plurality of coils (31) and an insulator (5). The iron core (34) includes a plurality of teeth (32). The rotor (2) has a permanent magnet (22). The rotor (2) is provided on an inner side of the stator (3) to be rotatable around a shaft (23) as a center with a gap (6) being provided between the stator (3) and the rotor (2). The rotor (2) includes a plurality of segments divided in a rotation axis direction X, the plurality of segments being rotatable relatively to each other such that a magnetic flux output from the rotor changes.

This aspect enables the rotor to be rotated at an increased speed when a load applied to the rotor is small, thereby providing the advantage of high work efficiency.

In an electric tool (10) of a second aspect referring to the first aspect, the rotor (2) includes the plurality of segments divided in the rotation axis direction X, the plurality of segments being rotatable relatively to each other such that the magnetic flux output from the rotor (2) changes in accordance with a torque applied to the shaft (23).

This aspect enables the rotor to be rotated at an increased speed when a load applied to the rotor is small, thereby providing the advantage of high work efficiency.

In an electric tool (10) of a third aspect referring to the second aspect, the rotor (2) is configured to increase the magnetic flux output from the rotor (2) as the torque applied to the shaft (23) increases.

This aspect enables the rotor to be rotated at an increased speed when a load applied to the rotor is small, thereby providing the advantage of high work efficiency.

In an electric tool (10) of a fourth aspect referring to the first aspect, the rotor (2) includes the plurality of segments divided in the rotation axis direction X, the plurality of segments being rotatable relatively to each other such that the magnetic flux output from the rotor (2) changes in accordance with a number of rotations of the shaft (23).

This aspect enables the rotor to be rotated at an increased speed when a load applied to the rotor is small, thereby providing the advantage of high work efficiency.

In an electric tool (10) of a fifth aspect referring to the fourth aspect, the rotor (2) is configured to reduce the magnetic flux output from the rotor (2) as the rotation speed of the shaft (23) increases.

This aspect enables the rotor to be rotated at an increased speed when a load applied to the rotor is small, thereby providing the advantage of high work efficiency.

An electric tool (10) of a sixth aspect referring to any one of the first to fifth aspects further includes a clutch connecting the plurality of segments of the rotor (2) to each other.

This aspect has the advantage that power is transmittable to the plurality of segments of the rotor (2).

In an electric tool (10) of a seventh aspect referring to the sixth aspect, the clutch is a magnetic clutch.

This aspect has the advantage that power is transmittable to the plurality of segments of the rotor (2).

In an electric tool (10) of an eighth aspect referring to any one of the first to seventh aspects, at least one segment of the plurality of segments of the rotor (2) is provided as the first rotor part (20a). A position of the rotor (2) is sensed by sensing a position of the first rotor part (20a).

This aspect has the advantage that detection of the position of the first rotor part (20a) enables the rotation of the rotor (2) to be controlled.

In an electric tool (10) of a ninth aspect referring to the eighth aspect, at least one segment of the plurality of segments of the rotor (2) is provided as the second rotor part (20b). The first rotor part (20a) is not fixed to the shaft (23). The second rotor part (20b) is fixed to the shaft (23).

This aspect enables the rotor to be rotated at an increased speed when a load applied to the rotor is small, thereby providing the advantage of high work efficiency.

In an electric tool (10) of a tenth aspect referring to any one of the first to ninth aspects, the rotor (2) is configured to rotate forwardly and reversely. The rotor (2) is configured such that the magnetic flux output from the rotor (2) changes in both the forward rotation and the reverse rotation.

This aspect enables the rotor to be rotated at an increased speed when a load applied to the rotor is small, thereby providing the advantage of high work efficiency.

In an electric tool (10) of an eleventh aspect referring to the tenth aspect, the rotor (2) is configured such that a change in the magnetic flux in the forward rotation is different from a change in the magnetic flux in the reverse rotation.

This aspect enables the rotor to be rotated at an increased speed when a load applied to the rotor is small, thereby providing the advantage of high work efficiency.

An electric tool (10) of a twelfth aspect referring to any one of the first to eleventh aspects further includes a battery pack (101) configured to supply electric power to the motor (1).

This aspect provides the advantage that the motor (1) is driven by the battery pack (101).

REFERENCE SIGNS LIST

1 Motor
2 Rotor
20a First Rotor Part
20b Second Rotor Part
3 Stator
30 Coil Unit
34 Iron Core
101 Battery Pack
102 Transmission Mechanism
103 Output Shaft
106 Trigger Switch
107 Controller
X Rotation Axis Direction

The invention claimed is:
1. An electric tool, comprising:
a motor;
a trigger switch configured to be operated by a user;
a transmission mechanism disposed between the motor and an output shaft; and
a controller configured to perform, based on an operation given to the trigger switch, drive control of the motor, wherein:
the motor includes:
a stator having
a coil unit including a plurality of coils and an insulator, and
an iron core including a plurality of teeth, and
a rotor having a permanent magnet provided on an inner side of the stator to be rotatable around a shaft as a center with a gap being provided between the stator and the rotor,
the rotor includes a plurality of segments divided in a rotation axis direction,
the plurality of segments are rotatable relatively to each other such that a magnetic flux output from the rotor changes,
at least one segment of the plurality of segments constitutes a first rotor part, and at least another one segment different from the first rotor part of the plurality of segments constitutes a second rotor part,
the first rotor part has a pair of first projection sections,
the second rotor part has a pair of second projection sections,
the pair of first projection sections and the pair of second projection sections are respectively provided on a surface of the first rotor part and a surface of the second rotor part, the surface of the first rotor part and the surface of the second rotor part facing each other, and
the pair of first projection sections and the pair of second projection sections are caught on each other, and the first rotor part and the second rotor part rotate at a same speed.

2. The electric tool of claim 1, wherein
the plurality of segments are rotatable relatively to each other such that the magnetic flux output from the rotor changes in accordance with a torque applied to the shaft.

3. The electric tool of claim 2, wherein
the rotor is configured to increase the magnetic flux output from the rotor as the torque applied to the shaft increases.

4. The electric tool of claim 1, wherein
the plurality of segments are rotatable relatively to each other such that the magnetic flux output from the rotor changes in accordance with a number of rotations of the shaft.

5. The electric tool of claim 4, wherein
the rotor is configured to reduce the magnetic flux output from the rotor as the rotation speed of the shaft increases.

6. The electric tool of claim 1, further comprising a clutch connecting the plurality of segments of the rotor to each other.

7. The electric tool of claim 6, wherein
the clutch is a magnetic clutch.

8. The electric tool of claim 1, wherein
a position of the rotor is sensed by sensing a position of the first rotor part.

9. The electric tool of claim 8, wherein:
the first rotor part is not fixed to the shaft, and
the second rotor part is fixed to the shaft.

10. The electric tool of claim 1, wherein
the rotor is configured to rotate forwardly and reversely, and
the rotor is configured such that the magnetic flux output from the rotor changes in both the forward rotation and the reverse rotation.

11. The electric tool of claim 10, wherein
the rotor is configured such that a change in the magnetic flux in the forward rotation is different from a change in the magnetic flux in the reverse rotation.

12. The electric tool of claim 1, further comprising a battery pack configured to supply electric power to the motor.

13. The electric tool of claim 2, further comprising a clutch connecting the plurality of segments of the rotor to each other.

14. The electric tool of claim 13, wherein
the clutch is a magnetic clutch.

15. The electric tool of claim 2, wherein
a position of the rotor is sensed by sensing a position of the first rotor part.

16. The electric tool of claim 15, wherein
the first rotor part is not fixed to the shaft, and
the second rotor part is fixed to the shaft.

17. The electric tool of claim 2, wherein
the rotor is configured to rotate forwardly and reversely, and
the rotor is configured such that the magnetic flux output from the rotor changes in both the forward rotation and the reverse rotation.

18. The electric tool of claim 17, wherein
the rotor is configured such that a change in the magnetic flux in the forward rotation is different from a change in the magnetic flux in the reverse rotation.

19. The electric tool of claim 2, further comprising a battery pack configured to supply electric power to the motor.

20. The electric tool of claim 1, wherein:
the first rotor part includes a first permanent magnet and the second rotor art includes a second permanent magnet, and
when the pair of first projection sections and the pair of second projection sections are caught on each other, the first permanent magnet and the second permanent magnet face each other with a same pole.

* * * * *